US007926177B2

(12) United States Patent
Kang et al.

(10) Patent No.: US 7,926,177 B2
(45) Date of Patent: Apr. 19, 2011

(54) METHOD OF FORMING HYDROPHOBIC COATING LAYER ON SURFACE OF NOZZLE PLATE OF INKJET PRINTHEAD

(75) Inventors: Sung-gyu Kang, Suwon-si (KR); Kae-dong Back, Yongin-si (KR); Seung-mo Lim, Suwon-si (KR); Jae-woo Chung, Yongin-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1338 days.

(21) Appl. No.: 11/425,204

(22) Filed: Jun. 20, 2006

(65) Prior Publication Data

US 2007/0120889 A1 May 31, 2007

(30) Foreign Application Priority Data

Nov. 25, 2005 (KR) ........................ 10-2005-0113498
Dec. 16, 2005 (KR) ........................ 10-2005-0124379

(51) Int. Cl.
*B23P 17/00* (2006.01)
*B21D 53/76* (2006.01)
*B41J 2/15* (2006.01)
*B41J 2/145* (2006.01)

(52) U.S. Cl. ........................................ 29/890.1; 347/41

(58) Field of Classification Search ................. 29/890.1, 29/890.12, 890.131, 890.142, 890.143; 347/41, 347/45, 47; 427/259, 261, 265, 271, 272
See application file for complete search history.

(56) References Cited

U.S. PATENT DOCUMENTS 6,276,057 B1 * 8/2001 Aihara et al. ................ 29/890.1
7,325,309 B2 * 2/2008 Strand et al. ................ 29/890.1
7,325,310 B2 * 2/2008 Kim ............................ 29/890.1
2004/0017428 A1 * 1/2004 Cronin et al. .................. 347/47
2005/0109730 A1 * 5/2005 Silverbrook .................... 216/27
2005/0144781 A1 * 7/2005 Silverbrook ................ 29/890.1
2006/0026834 A1 * 2/2006 Nishida ...................... 29/890.1
2007/0034598 A1 * 2/2007 Silverbrook et al. ........... 216/27

FOREIGN PATENT DOCUMENTS

JP 7-314693 12/1995

* cited by examiner

*Primary Examiner* — A. Dexter Tugbang
*Assistant Examiner* — David P Angwin
(74) *Attorney, Agent, or Firm* — Stanzione & Kim, LLP

(57) ABSTRACT

A method of forming a hydrophobic coating layer on a surface of a nozzle plate of an inkjet printhead includes forming a plurality of nozzles in the nozzle plate, each of the nozzles having an exit, stacking a film on the surface of the nozzle plate to cover the exit of each of the nozzles, forming a predetermined metal layer on an inner wall of each of the nozzles and an inner surface of the film covering the exit of each of the nozzles using a plating method, removing the film from the surface of the nozzle plate, forming a hydrophobic coating layer on the surface of the nozzle plate to cover the metal layer exposed through the exit of each of the nozzles, and removing the metal layer formed on the inner wall of each of the nozzles and the hydrophobic coating layer formed on the surface of the metal layer.

13 Claims, 9 Drawing Sheets

METHOD OF FORMING HYDROPHOBIC COATING LAYER ON SURFACE OF NOZZLE PLATE OF INKJET PRINTHEAD

CROSS-REFERENCE TO RELATED APPLICATIONS

This application claims priority under 35 U.S.C. §119(a) from Korean Patent Applications Nos. 10-2005-0113498, filed on Nov. 25, 2005, in the Korean Intellectual Property Office, and 10-2005-0124379, filed on Dec. 16, 2005, in the Korean Intellectual Property Office, the disclosures of which are incorporated herein by reference in their entireties.

BACKGROUND OF THE INVENTION

1. Field of the Invention

The present general inventive concept relates to an inkjet printhead having a hydrophobic layer, and more particularly, to a method of forming a hydrophobic coating layer on a surface of a nozzle plate of an inkjet printhead.

2. Description of the Related Art

An inkjet printhead is a device that ejects fine ink droplets onto a desired position of a recording medium to print an image of a predetermined color. The inkjet printhead may be roughly classified into two types of printheads, depending on an ink ejecting method employed: thermally-driven inkjet printheads and piezoelectric inkjet printheads. A thermally-driven inkjet printhead generates a bubble in ink using a heat source and ejects the ink using an expansion force of the bubble. A piezoelectric inkjet printhead deforms a piezoelectric element and ejects ink using a pressure applied to the ink due to the deformation of the piezoelectric element.

FIG. 1 is a sectional view illustrating a construction of a conventional piezoelectric inkjet printhead.

Referring to FIG. 1, a channel plate 10 includes a manifold 13, a plurality of restrictors 12, and a plurality of pressure chambers 11. A nozzle plate 20 includes a plurality of nozzles 22 corresponding to the pressure chambers 11. Also, a piezoelectric actuator 40 is provided on an upper portion of the channel plate 10. The manifold 13 is a passage supplying ink flowing from an ink storage (not illustrated) to each of the pressure chambers 11, and each of the restrictors 12 is a passage through which the ink flows from the manifold 13 into each of the pressure chambers 11. The plurality of pressure chambers 11, which are filled with ink to be ejected, are arranged on one side or both sides of the manifold 13. Each pressure chamber 11 changes its volume as the piezoelectric actuator 40 is driven, thereby creating a pressure change required for an ejection of ink or for an in-flow of ink. A portion that constitutes an upper wall of each of the pressure chambers 11 contained in the channel plate 10 serves as a vibration plate 14 that is deformable by a driving of the piezoelectric actuator 40.

The piezoelectric actuator 40 includes a lower electrode 41, a piezoelectric layer 42, and an upper electrode 43 sequentially stacked on the channel plate 10. A silicon oxide layer 31 is formed as an insulation layer between the lower electrode 41 and the channel plate 10. The lower electrode 41 is formed on an entire surface of the silicon layer 31 to serve as a common electrode. The piezoelectric layer 42 is formed on the lower electrode 41 such that the piezoelectric layer 42 is positioned on the plurality of pressure chambers 16. The upper electrode 43 is formed on the piezoelectric layer 42 to serve as a drive electrode, applying a voltage to the piezoelectric layer 42.

In the inkjet printhead having the above construction, water-repellent processing of a surface of the nozzle plate 20 has a direct influence on an ink ejection performance thereof, such as a directionality and an ejection speed of an ink droplet ejected through each of the nozzles 22. To improve an ink ejection performance, the surface of the nozzle plate 20 outside of the nozzles 22 should have a water-repellent characteristic, i.e., should be hydrophobic, and an inner wall of each of the nozzles 22 should be hydrophilic. In detail, when the surface of the nozzle plate 20 outside of the nozzles 22 is hydrophobic, ink wetting on the surface of the nozzle plate 20 is prevented, so that the directionality of ejected ink may be improved. Also, when the inner wall of each of the nozzles 22 is hydrophilic, a contact angle with respect to an ink droplet decreases and thus capillary force increases, so that a refill time of ink is shortened and an ejection frequency may be increased. Also, since each of the nozzles 22 is filled with ink up to an exit thereof, a uniformity of ink ejection may be improved.

A method of forming a hydrophobic coating layer over the entire nozzle plate 20 having the nozzles 22 therein using an electron beam evaporation method has been conventionally-used. According to this conventional method, the hydrophobic coating layer is formed on the inner wall of each of the nozzles 22, as well as the surface of the nozzle plate 20 outside of the nozzles 22. The hydrophobic coating layer formed on the inner wall of each of the nozzles 22 reduces refill characteristics of ink and ejection uniformity.

To solve these problems, conventional methods of forming a hydrophobic coating layer only on the surface of the nozzle plate 20 are under development.

FIG. 2 is a view illustrating a conventional inkjet printhead on which a sulphur compound layer is formed as a hydrophobic coating layer on a surface of a nozzle plate 51 thereof.

Referring to FIG. 2, after a metal layer 52 is formed on the surface of the nozzle plate 51 including a plurality of nozzles 55, each nozzle 55 being formed to pass through the nozzle plate 51, a sulphur compound is coated on the surface of the metal layer 52 to form a sulphur compound layer 53. The sulphur compound is selectively coated on the surface of the metal layer 52. However, according to this method, there is a high probability that the metal layer 52 is deposited on an inner wall of each of the nozzles 55 as well as the surface of the nozzle plate 51. Also, when a number of the nozzles 55 is large, the metal layer 52 may be non-uniformly deposited on different portions of each of the nozzles 55. In this case, the sulphur compound layer 53 may be formed on the inner wall of each of the nozzles 55 or may be non-uniformly formed. When the sulphur compound layer 53, which is a hydrophobic coating layer, is not properly formed, areas around each of the nozzles 55 are easily contaminated by ink and an ejection speed of an ink droplet is reduced or an ejection direction of an ink droplet becomes non-uniform, so that an ejection performance is impaired.

FIG. 3 is a view illustrating a conventional inkjet printhead on which a water-repellent layer including a fluorine resin is formed on a surface of a nozzle plate 70 thereof.

Referring to FIG. 3, a water-repellent layer 90 is formed on the surface of the nozzle plate 70 having nozzles 72. This water-repellent layer 90 includes a fluorine resin particle 94 and a hard body 98 contained in a nickel base 96. A fluorine resin layer 92 is formed on the surface of the water-repellent layer. However, since nickel is reactive with a portion of ink, nickel is undesirable for commercial use.

Japanese Patent Laid-Open Publication No. hei 7-314693 discloses a method of forming a water-repellent layer on a surface of a nozzle plate by blowing a gas through nozzles of the nozzle plate to prevent the water-repellent layer from being formed on an inner surface of each of the nozzles. However, this method requires a complicated apparatus and a difficult process, and thus it is difficult and expensive to use this method.

SUMMARY OF THE INVENTION

The present general inventive concept provides a method of forming a hydrophobic coating layer on a surface of a nozzle plate of an inkjet printhead to improve ejection directionality and ejection uniformity of the inkjet printhead and to increase an ejection frequency.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of forming a hydrophobic coating layer on a surface of a nozzle plate of an inkjet printhead, the method including forming a plurality of nozzles in the nozzle plate, each of the nozzles having an exit and an inner wall, stacking a film on the surface of the nozzle plate such that a portion of the film covers the exit of each of the nozzles, forming a predetermined metal layer on the inner wall of each of the nozzles and the portion of the film covering the exit of each of the nozzles using a plating method, removing the film from the surface of the nozzle plate, forming the hydrophobic coating layer on the surface of the nozzle plate such that the hydrophobic coating layer covers the predetermined metal layer exposed through the exit of each of the nozzles, and removing the predetermined metal layer formed on the inner wall of each of the nozzles and the hydrophobic coating layer formed on the surface of the metal layer.

The method may further include forming a seed layer on the inner wall of each of the nozzles and the inner surface of the film covering the exit of each of the nozzles after the stacking of the film and before forming the predetermined metal layer.

The method may further include etching the predetermined metal layer exposed through the exit of each of the nozzles to a predetermined depth after the removing of the film. The predetermined metal layer may be etched to a depth of about 1 to about 10 μm.

The predetermined metal layer may be formed using a damascening plating method.

The hydrophobic coating layer formed on the surface of the predetermined metal layer may be removed by a dry etching method after the predetermined metal layer formed on the inner wall of each of the nozzles is removed.

The foregoing and/or other aspects and utilities of the present general inventive concept may also be achieved by providing a method of forming a hydrophobic coating layer on a surface of a nozzle plate of an inkjet printhead, the method including forming a plurality of nozzles in the nozzle plate, each of the nozzles having an exit, stacking a film on the surface of the nozzle plate such that the film covers the exit of each of the nozzles, forming a polymer layer on an inner wall of each of the nozzles and an inner surface of the film covering the exit of each of the nozzles, removing the film from the surface of the nozzle plate, forming a hydrophobic coating layer on the surface of the nozzle plate such that the hydrophobic coating layer covers the polymer layer exposed through the exit of each of the nozzles, and removing the polymer layer formed on the inner wall of each of the nozzles and the hydrophobic coating layer formed on the surface of the polymer layer.

The method may further include etching the polymer layer exposed through the exit of each of the nozzles to a predetermined depth after the removing of the film. The polymer layer may be etched using a dry etching method. The polymer layer may be etched to a depth of about 1 to about 10 μm.

The forming of the polymer layer may include coating a polymer in a liquid state on the inner wall of each of the nozzles and the inner surface of the film covering the exit of each of the nozzles, and thermally treating the coated polymer to harden the coated polymer. The polymer in the liquid state may be coated using a spray coating method.

The polymer layer may be formed of a photoresist.

The hydrophobic coating layer formed on the surface of the polymer layer may be removed through a dry etching method after the polymer layer formed on the inner wall of each of the nozzles is removed.

The hydrophobic coating layer may include a material that is not damaged by the removing of the polymer layer. The hydrophobic coating layer may include parylene.

The foregoing and/or other aspects and utilities of the present general inventive concept may also be achieved by providing a method of forming a hydrophobic layer on a nozzle plate of an inkjet printhead, the nozzle plate having inner and outer surfaces and a plurality of nozzles having nozzle openings and inner nozzle surfaces, the method including forming a first layer having a predetermined material on the outer surface of the nozzle plate to cover the nozzle openings, forming a second layer having a predetermined material on the inner surface of the nozzles plate to cover the inner nozzle surfaces and the nozzle openings, removing the first layer to uncover the outer surface of the nozzle plate and to expose portions of the second layer through the nozzle openings, forming the hydrophobic layer on the outer surface of the nozzle plate, the nozzle openings, and the exposed portions of the second layer, and removing the second layer and the portion of the hydrophobic layer formed on the exposed portions of the second layer.

The second layer may include a metal layer having at least one metal compound. The second layer may include a plurality of the metal layers, each having the at least one metal compound. The second layer may include a polymer layer having at least one polymer material. The at least one polymer material may be a light sensitive polymer material. The second layer may include a plurality of the polymer layers, each having the at least one polymer material.

A thickness of a first portion of the second layer formed on upper portions of the inner nozzle surfaces may be greater than a thickness of a second portion of the second layer on remaining portions of the inner nozzle surfaces. The forming of the hydrophobic layer may include forming the hydrophobic layer on upper portions of the inner nozzle surfaces located within a predetermined distance from the nozzle openings. The method may further include etching the second layer to a predetermine depth before forming the hydrophobic layer to uncover the upper portions of the inner nozzle surfaces.

The method may further include forming an intermediate layer on the inner surface of the nozzle plate, and forming the second layer on the intermediate layer. The intermediate layer may include at least one metal and the second layer may include at least one metal. The intermediate layer may include a metal and the second layer may also include the metal. The intermediate layer may include a plurality of metal layers.

The foregoing and/or other aspects and utilities of the present general inventive concept may also be achieved by providing a method of forming a hydrophobic layer on a nozzle plate of an inkjet printhead, the nozzle plate having first and second surfaces, a plurality of nozzles having nozzle openings and inner nozzle surfaces, and a covering layer formed on the second surface of the nozzle plate to cover the inner nozzle surfaces and the nozzle openings and having exposed portions exposed through the nozzle openings to the first surface of the nozzle plate, the method including forming the hydrophobic layer on the first surface of the nozzle plate, the nozzle openings, and the exposed portions of the covering layer, and removing the covering layer and portions of the hydrophobic layer formed on the exposed portions of the covering layer.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
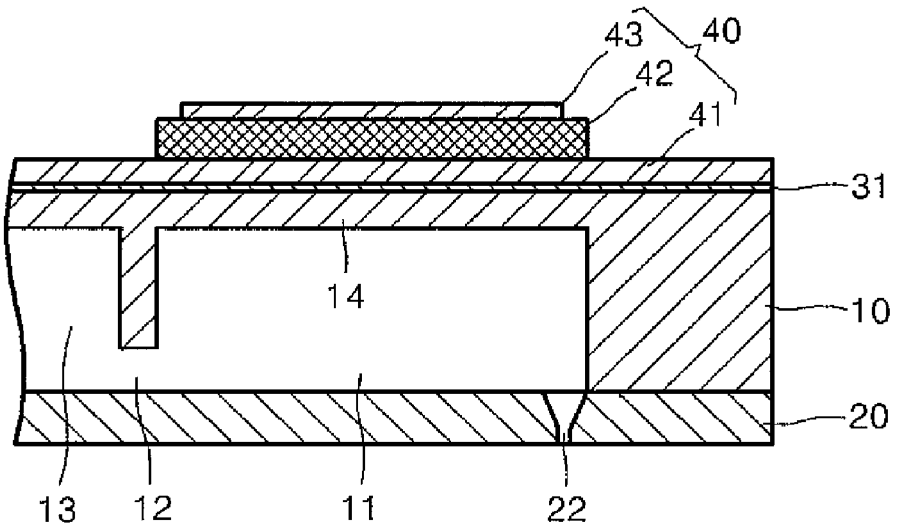
FIG. 1 (PRIOR ART)
FIG. 1 is a sectional view illustrating a construction of a conventional piezoelectric inkjet printhead.
Figure 2:
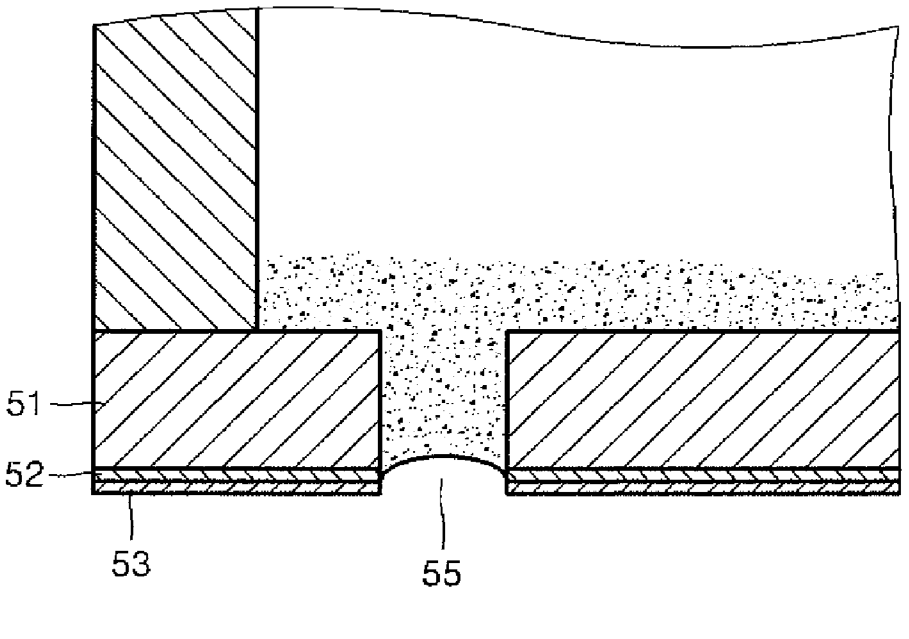
FIG. 2 (PRIOR ART)
FIG. 2 is a sectional view illustrating a conventional inkjet printhead on which a sulphur compound layer is formed as a hydrophobic coating layer on a surface of a nozzle plate thereof.
Figure 3:
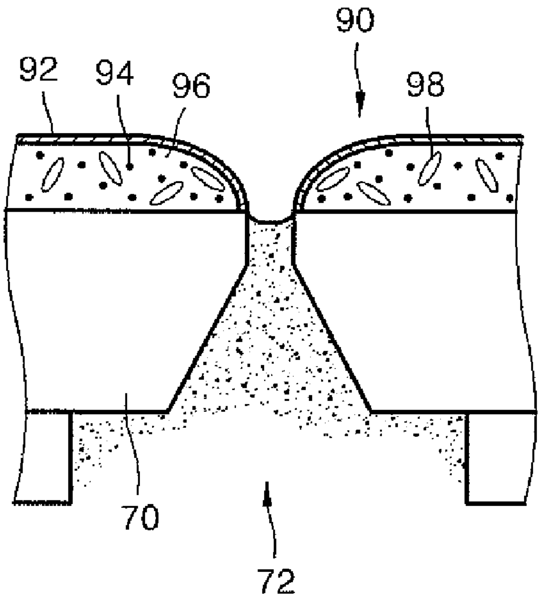
FIG. 3 (PRIOR ART)
FIG. 3 is a sectional view illustrating a conventional inkjet printhead on which a water-repellent layer including a fluorine resin is formed on a surface of a nozzle plate thereof.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. In the drawings, thicknesses of layers and regions may be exaggerated for clarity. A method of forming a hydrophobic coating layer on a surface of a nozzle plate, according to embodiments of the present general inventive concept, may be used on a thermal-driven type inkjet printhead as well as a piezoelectric inkjet printhead.

FIGS. 4A through 4H are views illustrating a method of forming a hydrophobic coating layer on a surface of a nozzle plate 120 of an inkjet printhead, according to an embodiment of the present general inventive concept. In the drawings, a partial portion of the nozzle plate 120 is illustrated with a single nozzle 122 for convenience; however, the nozzle plate 120 includes a plurality of nozzles 122, such as tens to hundreds of nozzles 122 arranged in a line or a plurality of lines.

Figure 4A:
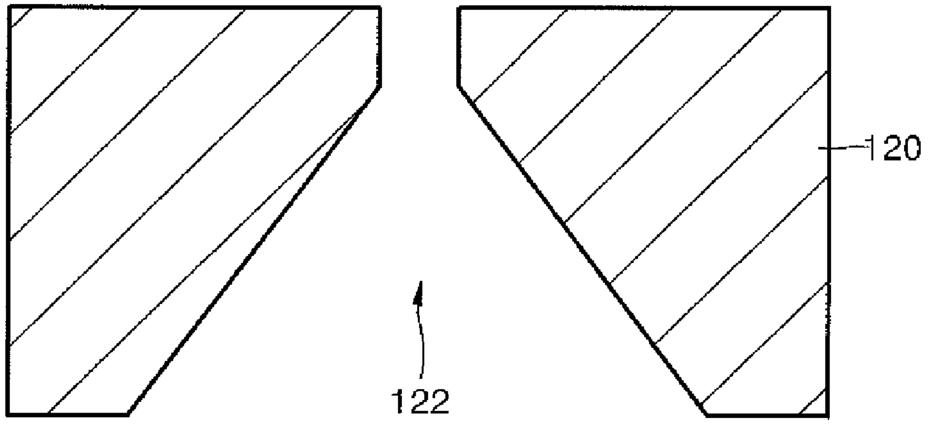
FIGS. 4A through 4H are views illustrating a method of forming a hydrophobic coating layer on a surface of a nozzle plate of an inkjet printhead, according to an embodiment of the present general inventive concept.
Figure 4B:
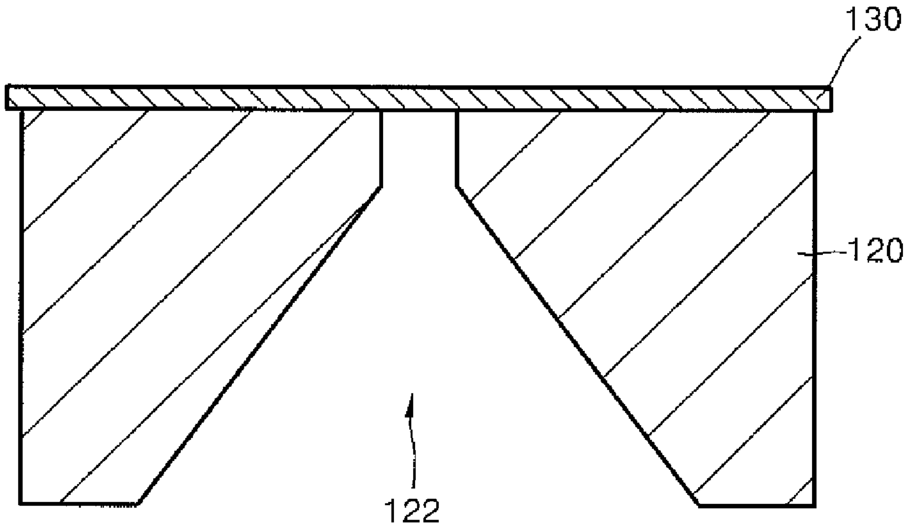

First, referring to FIG. 4A, the plurality of nozzles 122, each having a predetermined shape, are formed in the nozzle plate 120. The nozzle plate 120 may be, for example, a silicon wafer, which is widely used to manufacture a semiconductor device. Alternatively, the nozzle plate 120 may be, for example, a glass substrate or a metal substrate. Each of the nozzles 122 may have a shape such that a lower portion of each of the nozzles 122 has a decreasing cross-section along a direction from the lower portion to an exit of each of the nozzles 122 (i.e., a decreasing cross-section in an exit direction), and such that an upper portion of each of the nozzles 122 has a constant cross-section along the exit direction. Referring to FIG. 4B, a predetermined film 130 is stacked on the surface of the nozzle plate 120 to cover the exit of each of the nozzles 122.

Figure 4C:
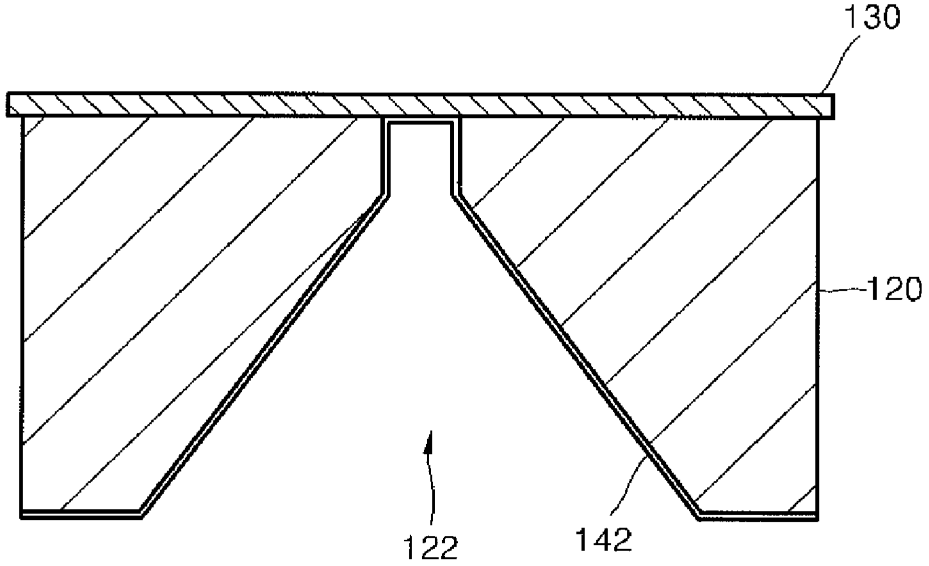

Referring to FIG. 4C, a seed layer 142 is formed on the inner wall of each of the nozzles 122 and an inner surface of the predetermined film 130 covering the exit of each of the nozzles 122. The seed layer 142 is a layer that allows a predetermined metal layer 144 (see FIG. 4D) to be swiftly plated on the inner wall of each of the nozzles 122 and the inner surface of the film 130. Here, the seed layer 142 may be formed of, for example, Cr and Cu, in which the Cr is formed on the inner wall of each of the nozzles 122 and the inner surface of the film 130 and the Cu is formed on Cr. However, the seed layer 142 may be formed of various metals besides Cr and Cu depending on a material to be plated.

Figure 4D:
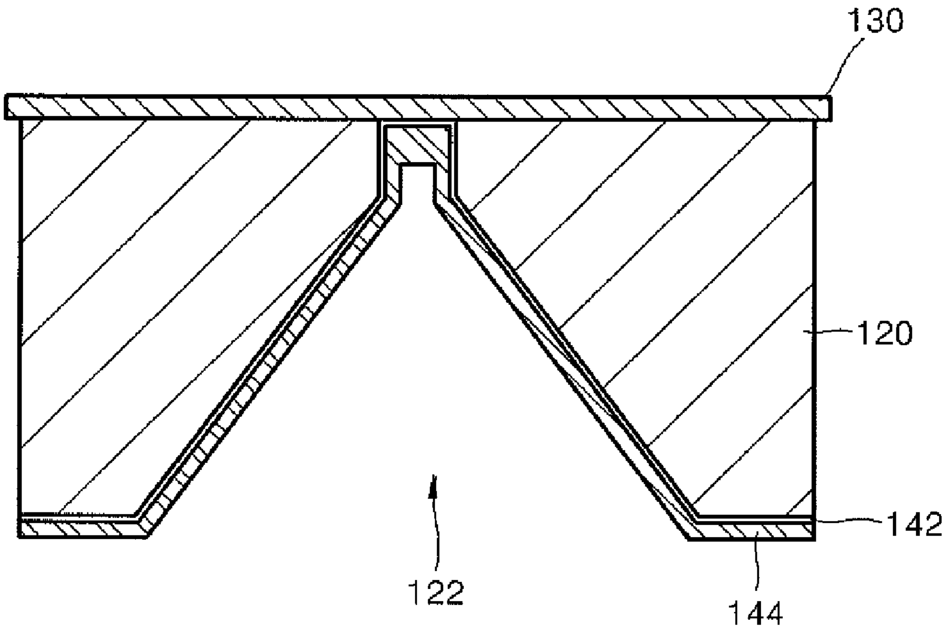

Referring to FIG. 4D, the predetermined metal layer 144 is formed on the seed layer 142 (which is formed on the inner wall of each of the nozzles 122 and the inner surface of the film 130 covering the exit of each of the nozzles 122) using a plating method. Here, the metal layer 144 may be formed of, for example, Cu. However, the metal layer 144 may be formed of various metals besides Cu. A variety of plating methods may be used to form the metal layer 144, such as a damascening plating method. When the damascening plating method is used to form the metal layer 144, plating can be well performed on an upper portion of each of the nozzles 122, which is formed narrowly at the exit of each of the nozzles 122. Accordingly, a portion of the metal layer 144 formed on the upper portion of each of the nozzles 122 has a thickness that is thicker than a thickness of a portion of the metal layer 144 formed on the inner wall of each of the nozzles 122.

Figure 4E:
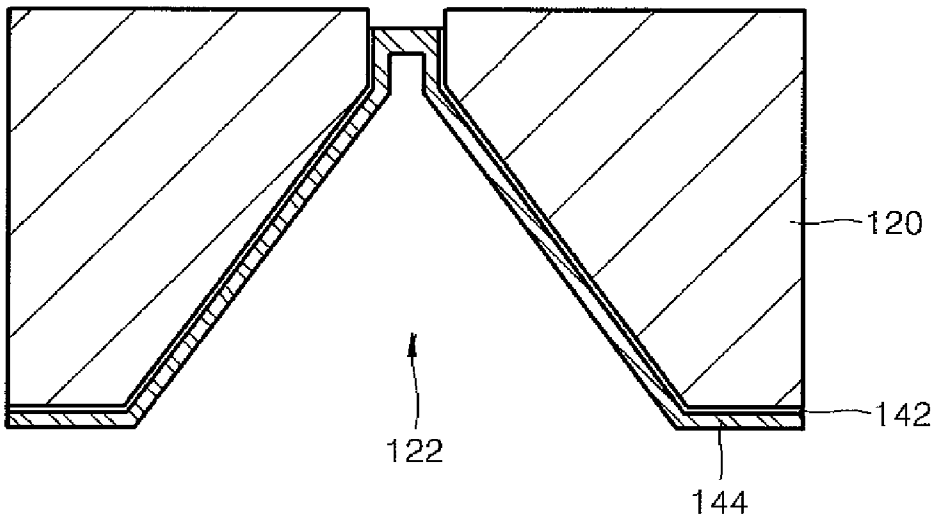

Referring to FIG. 4E, the film 130 stacked on the surface of the nozzle plate 120 is removed. The film 130 may be removed, for example, by using acetone or by manually removing the film 130 from the surface of the nozzle plate 120. The seed layer 142 and the metal layer 144 exposed through the exit of each of the nozzles 122 may be etched to a predetermined depth. When the seed layer 142 and the metal layer 144 are etched to the predetermined depth, a hydrophobic coating layer 150 (see FIG. 4F) may be formed on the inner wall at an upper end of each of the nozzles 122, as described below, to more effectively prevent ink wetting on the surface of the nozzle plate 120 located on the exit of each of the nozzles 122. Here, the depth to which the seed layer 142 and the metal layer 144 are etched may be controlled to a desired depth. For example, the metal layer 144 may be etched to a depth of about 1 to about 10 μm.

Figure 4F:
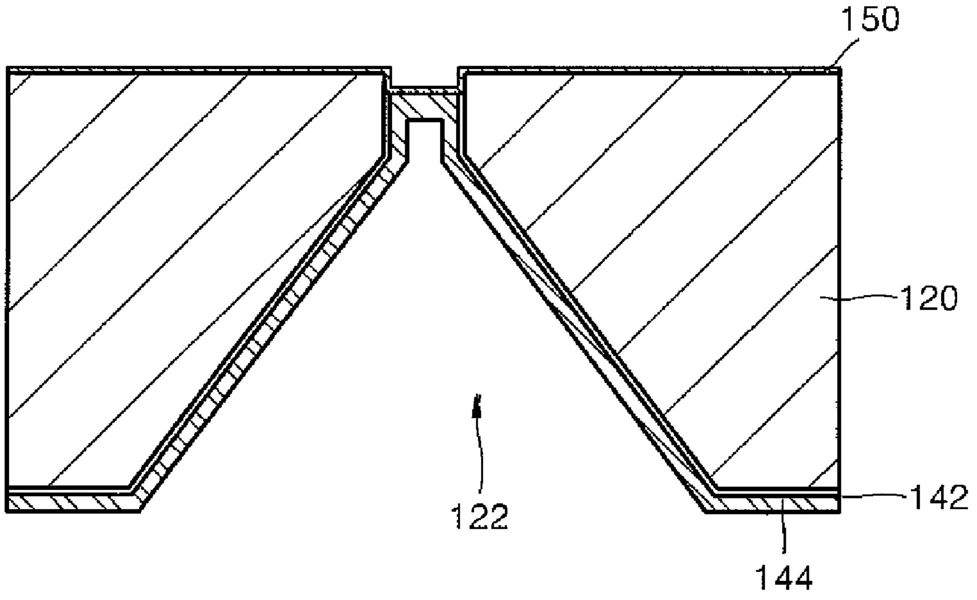
Figure 4G:
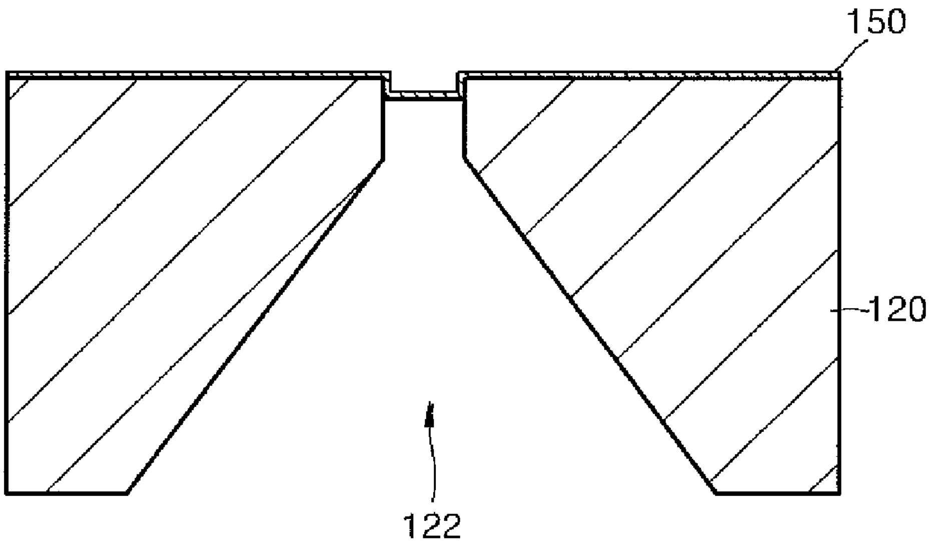
Figure 4H:
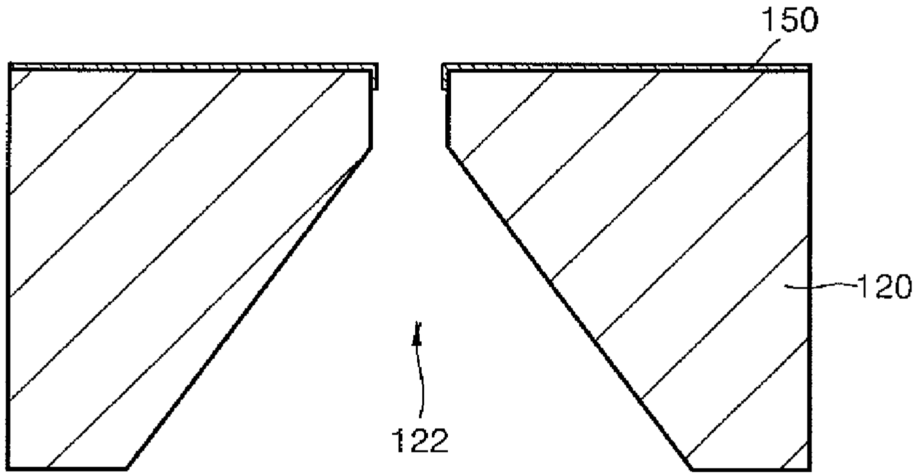

Referring to FIG. 4F, the hydrophobic coating layer 150 is formed on an entire surface of the nozzle plate 120 to cover the metal layer 144 exposed through the exit of each of the nozzles 122. Referring to FIG. 4G, the seed layer 142 and the metal layer 144 formed on the inner wall of each of the nozzles 122 are removed by, for example, using an etching process. Referring to FIG. 4H, the hydrophobic coating layer 150 covering the exit of each of the nozzles 122 is removed by, for example, using a dry etching process. Alternatively, a portion of the hydrophobic coating layer 150 covering the exit of each of the nozzles 122 may be simultaneously removed during the removing of the seed layer 142 and the metal layer 144, as opposed to being removed after the seed layer 142 and the metal layer 144 are removed.

When the hydrophobic coating layer 150 covering the exit of each of the nozzles 122 is removed, the hydrophobic coating layer 150 is formed on the surface of the nozzle plate 120 outside of the nozzles 122 and on the inner wall at the upper end of each of the nozzles 122 as illustrated in FIG. 4H. Accordingly, the surface of the nozzle plate 120 outside of the nozzles 122 and the inner wall at the upper end of each of the nozzles 122 are hydrophobic, and an entire inner wall except the inner wall at the upper end of each of the nozzles 122 is hydrophilic. According to another embodiment, an operation of etching the seed layer 142 and the metal layer 144 to a predetermined depth described with reference to FIG. 4E may be omitted. In this case, the hydrophobic coating layer 150 is formed only on the surface of the nozzle plate 120 outside the nozzles 122, and not on the inner wall at the upper end of each of the nozzles 122.

FIGS. 5A through 5G are views illustrating a method of forming a hydrophobic coating layer on a surface of a nozzle plate 220 of an inkjet printhead, according to another embodiment of the present general inventive concept.

Figure 5A:
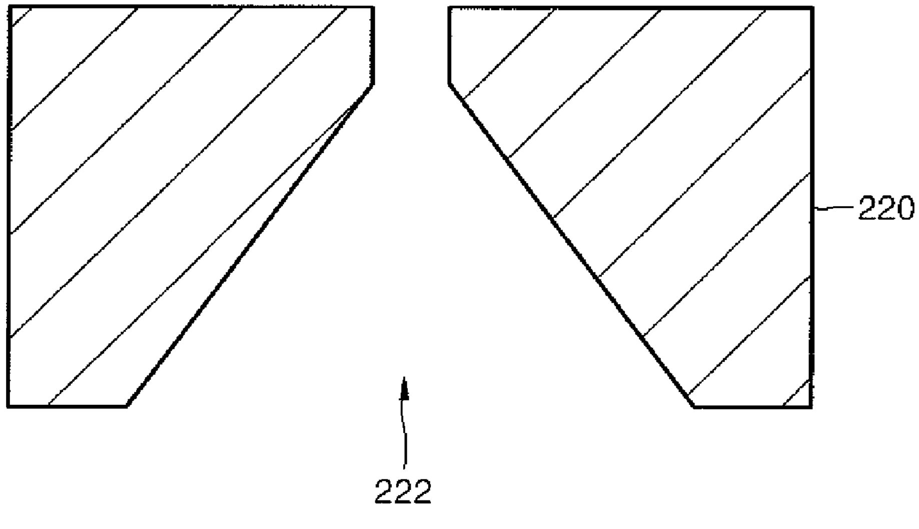
FIGS. 5A through 5G are views illustrating a method of forming a hydrophobic coating layer on a surface of a nozzle plate of an inkjet printhead, according to another embodiment of the present general inventive concept.
Figure 5B:
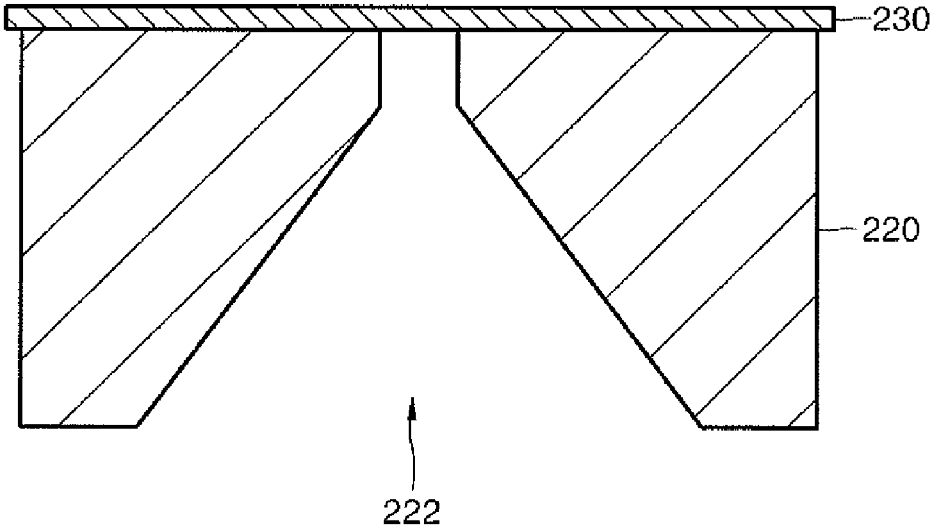

Referring to FIG. 5A, a plurality of nozzles 222 each having a predetermined shape are formed in the nozzle plate 220. The nozzle plate 220 may be, for example, a silicon wafer, which is widely used to manufacture a semiconductor device. Alternatively, the nozzle plate 220 may be, for example, a glass substrate or a metal substrate. Each of the nozzles 222 may have a shape such that a lower portion of each of the nozzles 222 has a decreasing cross-section along a direction from the lower portion to an exit of each of the nozzles 222 (i.e., a decreasing cross-section in an exit direction), and such that an upper portion of each of the nozzles 222 has a constant cross-section along the exit direction. Referring to FIG. 5B, a predetermined film 230 is stacked on the surface of the nozzle plate 220 to cover the exit of each of the nozzles 222.

Figure 5C:
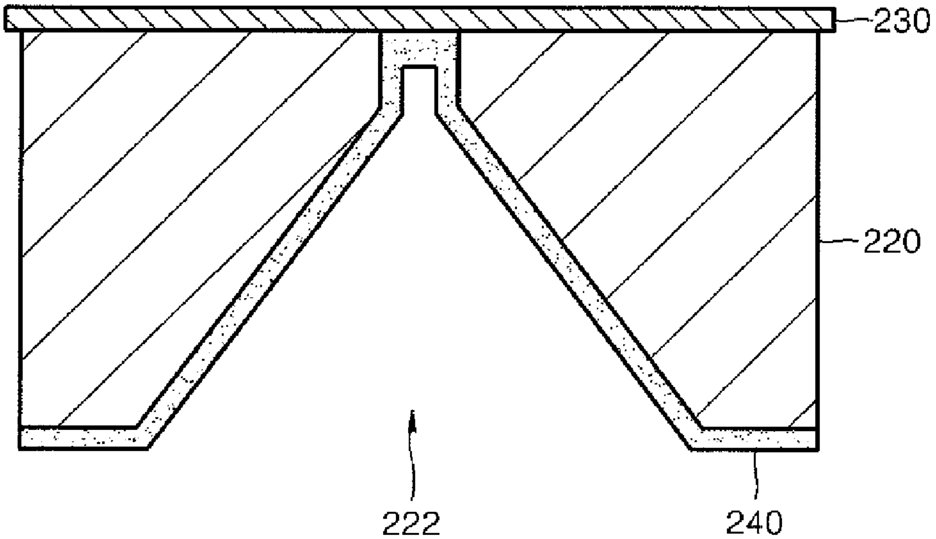

Referring to FIG. 5C, a polymer layer 240 is formed on an inner wall of each of the nozzles 222 and an inner surface of the film 230 covering the exit of each of the nozzles 222. Here, the polymer layer 240 may be formed of, for example, a photoresist. Alternatively, the polymer layer 240 may be formed of a material other than the photoresist. The polymer layer 240 may be formed by, for example, coating a polymer in a liquid state on the inner wall of each of the nozzles 222 and the inner surface of the film 230 (covering the exit of each of the nozzles 222) at a predetermined thickness, and thermally treating and hardening the coated polymer. The polymer in a liquid state may be coated by, for example, using a spray coating process.

Figure 5D:
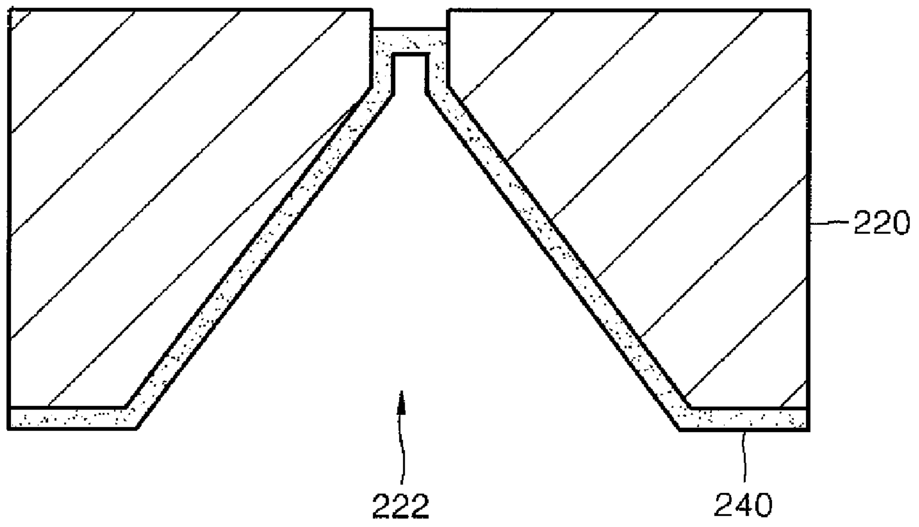

Referring to FIG. 5D, the film 230 stacked on the surface of the nozzle plate 220 is removed. Here, the film 230 may be removed, for example, by using acetone or by manually removing the film 230 from the surface of the nozzle plate 220. The polymer layer 240 exposed through the exit of each of the nozzles 222 may be etched to a predetermined depth. Here, the polymer layer 240 may be etched, for example, using a dry etching process. When the polymer layer 240 is etched to the predetermined depth, a hydrophobic coating layer 250 (see FIG. 5G) may be formed on the inner wall at an upper end of each of the nozzles 122, as described below, to more effectively prevent ink wetting on the surface of the nozzle plate 220 located on the exit of each of the nozzles 222. Here, the depth to which the polymer layer 240 is etched may be controlled to a desired value. For example, the polymer layer 240 may be etched to a depth of about 1 to about 10 μm.

Figure 5E:
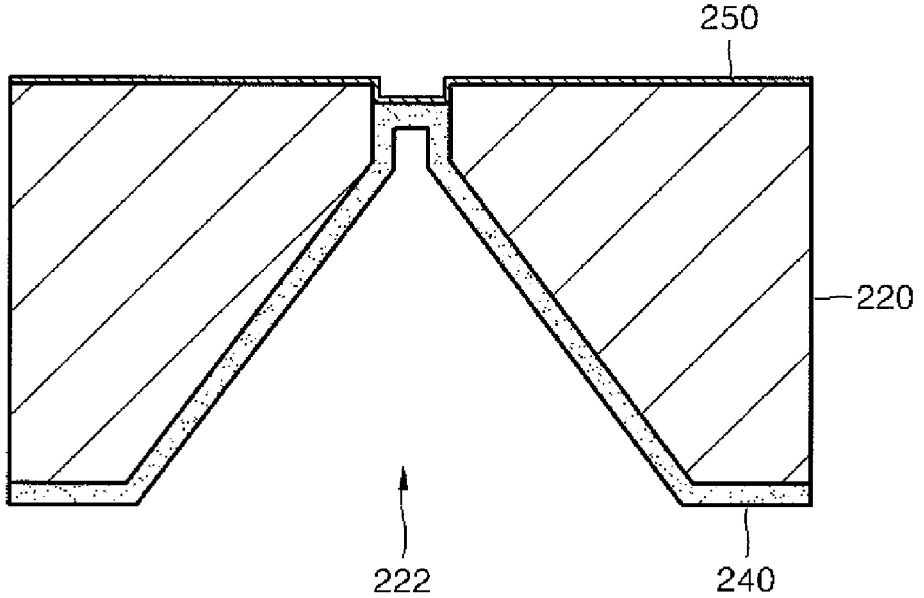

Referring to FIG. 5E, the hydrophobic coating layer 250 is formed at a predetermined thickness on an entire surface of the nozzle plate 220 to cover the polymer layer 240 exposed through the exit of each of the nozzles 222. The hydrophobic coating layer 250 may be formed of a material that is not damaged by the removing the polymer layer 240. For example, the hydrophilic coating layer 250 may be formed of parylene.

Figure 5F:
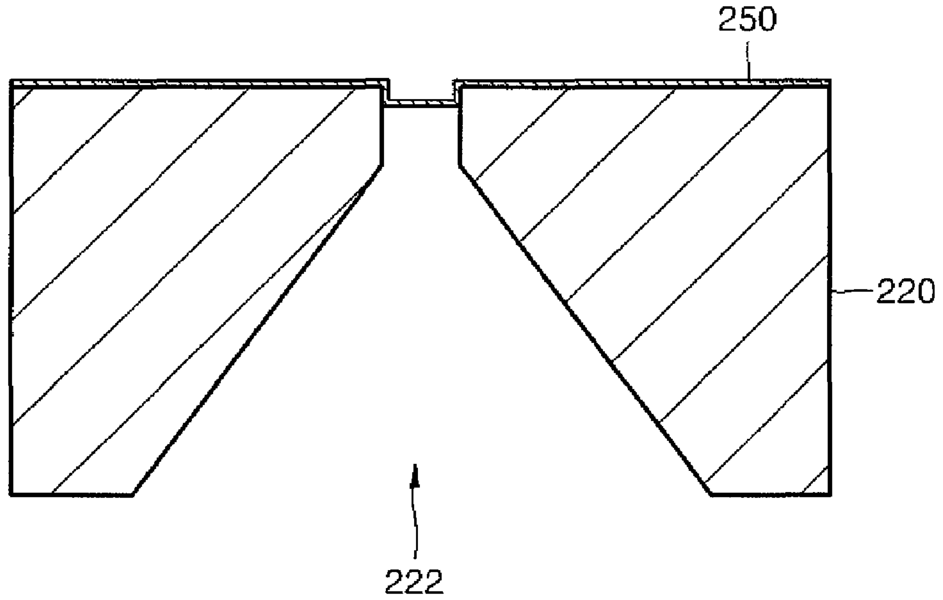
Figure 5G:
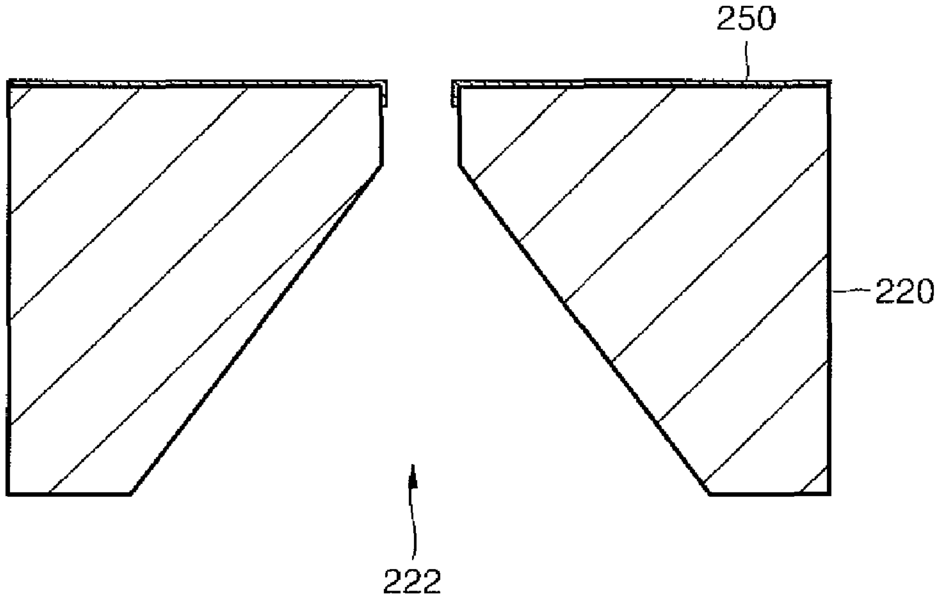

Referring to FIG. 5F, the polymer layer 240 formed on the inner wall of each of the nozzles 222 is removed. The polymer layer 240 may be removed by, for example, a striper, such as acetone. Referring to FIG. 5G, when the hydrophobic coating layer 250 covering the exit of each of the nozzles 222 is removed (for example, using the dry etching process), the hydrophobic coating layer 250 is formed on the surface of the nozzle plate 220 outside the nozzles 222 and the inner wall at the upper end of each of the nozzles 222. Accordingly, the surface of the nozzle plate 220 outside the nozzles 222 and on the inner wall at the upper end of each of the nozzles 222 are hydrophobic, and an entire inner wall except the inner wall at the upper end of each of the nozzles 222 has is hydrophilic. According to the present embodiment, an operation of etching the polymer layer 240 to the predetermined depth described with reference to FIG. 5D may be omitted. In this case, the hydrophobic coating layer 250 is formed only on the surface of the nozzle plate 220 outside the nozzles 222, and not on the inner wall at the upper end of each of the nozzles 222.

As described above, according to various embodiments of the present general inventive concept, a surface of a nozzle plate outside of the nozzles is hydrophobic, so that ink wetting on the surface of the nozzle plate is prevented and thus directionality of ejected ink may be secured. Also, an inner wall of each of the nozzles is hydrophilic, so that a refill time of ink is shortened and an ejection frequency is increased. Also, since each of the nozzles is filled with ink up to an exit thereof, a uniformity of ink ejection may be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of forming a hydrophobic layer on a nozzle plate of an inkjet printhead, the nozzle plate having inner and outer surfaces and a plurality of nozzles having nozzle openings and inner nozzle surfaces, the method comprising:

forming a first layer of a predetermined material on the outer surface of the nozzle plate to cover the nozzle openings;

forming a second layer of a predetermined material on the inner surface of the nozzles plate to cover the inner nozzle surfaces and the nozzle openings;

removing the first layer to uncover the outer surface of the nozzle plate and to expose portions of the second layer through the nozzle openings;

forming the hydrophobic layer on the outer surface of the nozzle plate, the nozzle openings, and the exposed portions of the second layer; and removing the second layer and the portion of the hydrophobic layer that was formed on the exposed portions of the second layer.

2. The method of claim 1, wherein the second layer comprises a metal layer having at least one metal compound.

3. The method of claim 1, wherein the second layer comprises a plurality of metal layers, each having at least one metal compound.

4. The method of claim 1, wherein the second layer comprises a polymer layer having at least one polymer material.

5. The method of claim 4, wherein the at least one polymer material is a light sensitive polymer material.

6. The method of claim 1, wherein the second layer comprises a plurality of polymer layers, each having at least one polymer material.

7. The method of claim 1, wherein a thickness of a first portion of the second layer formed on upper portions of the inner nozzle surfaces is greater than a thickness of a second portion of the second layer on remaining portions of the inner nozzle surfaces.

8. The method of claim 1, wherein the forming of the hydrophobic layer includes forming the hydrophobic layer on upper portions of the inner nozzle surfaces located within a predetermined distance from the nozzle openings.

9. The method of claim 8, further comprising:

etching the second layer to a predetermine depth before forming the hydrophobic layer to uncover the upper portions of the inner nozzle surfaces.

10. The method of claim 1, further comprising:

forming an intermediate layer on the inner surface of the nozzle plate; and forming the second layer on the intermediate layer.

11. The method of claim 10, wherein the intermediate layer includes at least one metal and the second layer includes at least one metal.

12. The method of claim 10, wherein the intermediate layer includes a metal and the second layer also includes the metal.

13. The method of claim 10, wherein the intermediate layer comprises a plurality of metal layers.

* * * * *